UNITED STATES PATENT OFFICE.

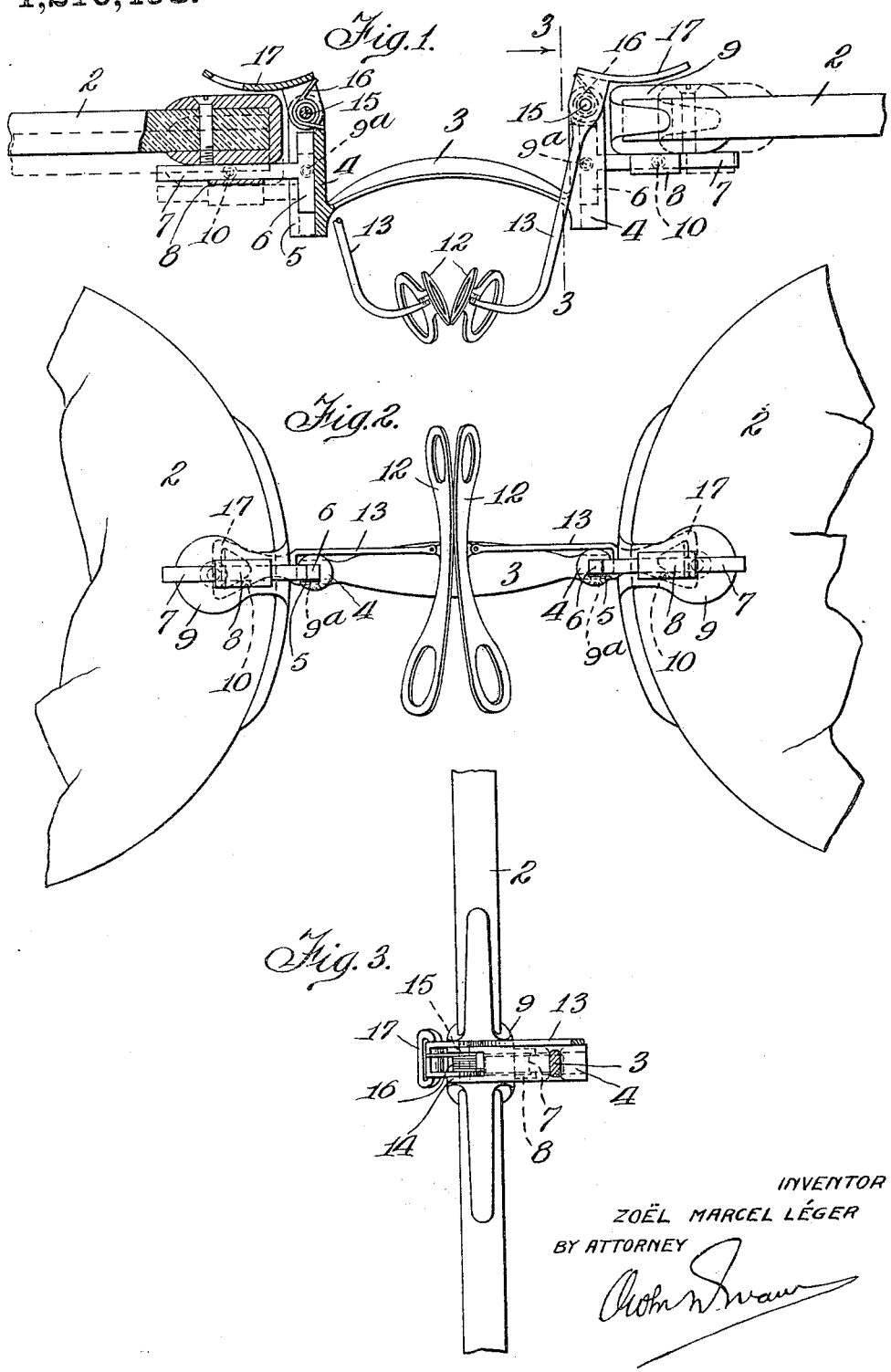

ZOËL MARCEL LÉGER, OF MONCTON, NEW BRUNSWICK, CANADA.

EYEGLASSES AND SPECTACLES.

1,210,498. Specification of Letters Patent. Patented Jan. 2, 1917.

Application filed July 10, 1916. Serial No. 108,489.

*To all whom it may concern:*

Be it known that I, ZOËL MARCEL LÉGER, a subject of the King of Great Britain, and resident of Moncton, Province of New Brunswick, Canada, have invented certain new and useful Improvements in Eyeglasses and Spectacles, and do hereby declare the following to be a full, clear, and exact description of same.

This invention relates to eyeglasses and spectacles either with or without rims and wherein the lenses are adjustable, the invention appertaining particularly to the mountings of such eyeglasses and spectacles.

An object of this invention is to provide an eyeglass wherein the lenses are bodily adjustable with relation to each other and forward and rearward that is to and from the bridge-bar transversely to the latter.

Another object of the invention is to improve and simplify the mount of this type of eyeglass and avoid unsightly or cumbersome construction.

The above with further objects and advantages will be hereinafter more fully described and particularly pointed out in the accompanying claims. For full comprehension, however, of my invention reference should be had to the accompanying drawings forming a part of this specification in which similar reference characters indicate the same parts and wherein:

Figure 1 is a plan view partly in horizontal section of my improved eyeglass; Fig. 2 is a rear elevation of same; and Fig. 3 is a transverse section on line 3—3 Fig. 1.

My improvements may be embodied in spectacles or eyeglasses which have rims or are rimless, the particular example illustrated in the drawings consisting of a rimless eyeglass, the lenses of which are indicated at 2 and the bridge-bar at 3. The bridge-bar may be arcuate or straight as desired and has at or near each end an open-ended socket 4 extending transversely to the bar and having a longitudinal slot or opening 5 preferably upon its outer side, the slot being for the accommodation of a lens supporting finger and its movement as will be presently described and the extent of the slot being dependent upon the movement required.

The lens supporting finger consists of a T-shaped member, one portion 6 thereof being slidably located within socket 4 and the other portion 7 extending through slot 5 outwardly therefrom where it has slidably mounted thereon an open-ended socket 8 carried by lens clasp 9 or lens rim in the case of rimmed lenses and disposed in the longitudinal plane of the bridge-bar.

The lenses can be adjusted relatively to one another and longitudinally with respect to the bridge-bar by sliding either one or both of the sockets 8 upon their respective fingers 7 while adjustment of the lenses to the front or rear transversely to the bridge-bar is effected by sliding the lens supporting fingers in the sockets 4, set-screws $9^a$ and 10 respectively, securing the members in the positions to which they have been adjusted. I prefer to make the lens supporting fingers 6, 7 and the bores of the sockets 4 and 8 of square or angular cross-section so as to prevent the swinging of such fingers and the lenses and thus increase the rigidity of the mounting.

Spring clip nose-pieces 12 are pivoted to the inner ends of arms 13 carried by the mounting preferably by means of spaced lugs 14 formed upon the outer ends of the sockets 4, each arm being bent at its outer end in U-form about the lugs of one socket to which lugs the arm is pivoted by pin 15 passing through same, the spaced lugs and U-bend of the arm accommodating a coil spring 16 which encircles pin 15 and has one end bearing against the end of the socket 4 and the other end bearing against the bent end of arm 13. The springs 16 normally swing the arms 13 and nose-pieces 12 carried thereby toward each other, such nose-pieces being spread apart for the application of the eyeglasses to the nose by finger-pieces 17 which extend outwardly from the bent ends of arms 13.

From the above it will be seen that a compactly and simply constructed mounting is provided for enabling the lenses to be adjusted relatively to each other both longitudinally and transversely with respect to the bridge-bar.

What I claim is as follows:

1. In eyeglasses and the like, the combination with a bridge-bar, lenses, sockets carried by the bridge-bar, lens supporting fingers slidably located in said sockets and sockets carried by the lenses, and slidably mounted upon said lens supporting fingers.

2. In eyeglasses and the like, the combination with a bridge-bar, lenses, sockets carried by the bridge-bar and having bores of angular cross-section, lens supporting fingers of angular cross-section slidably located in said sockets, and sockets carried by the lenses, slidably mounted upon said lens supporting fingers and having bores of angular cross-section.

3. In eyeglasses and the like, the combination with a bridge-bar, lenses, transversely disposed sockets carried by the bridge-bar, lens supporting fingers slidably located in said sockets and sockets carried by the lenses and slidably mounted upon said lens supporting fingers, the sockets carried by the lens and the lens supporting fingers being disposed longitudinally with respect to the bridge-bar.

4. In eyeglasses and the like, the combination with a bridge-bar, lenses, sockets carried by the bridge-bar, lens supporting fingers slidably located in said sockets, sockets carried by the lenses and slidably mounted upon said lens supporting fingers, and spring-clip nose-pieces pivotally mounted upon the sockets of the bridge-bar.

5. In eyeglasses and the like, the combination with a bridge-bar, lenses, transversely extending sockets carried at the ends of the bridge-bar, such sockets being slotted at one side and having bores of angular cross-section, T-shaped lens supporting fingers of angular cross-section, each having one portion slidably located in one of said sockets and the other portion extending through the slot in the socket outwardly longitudinally with respect to the bridge-bar, set-screws for clamping the lens supporting fingers in their sockets, sockets carried by the lenses and slidably mounted upon the outwardly extending portions of the lens supporting fingers, such sockets having bores of angular cross-section, and set-screws for clamping the sockets of the lenses to the said lens supporting fingers.

6. In eyeglasses and the like, the combination with a bridge-bar, lenses, transversely extending sockets carried at the ends of the bridge-bar, such sockets being slotted at one side and having bores of angular cross-section, spaced lugs upon the outer ends of the sockets, T-shaped lens supporting fingers of angular cross-section, each having one portion slidably located in one of said sockets and the other portion extending through the slot in the socket outwardly longitudinally with respect to the bridge-bar, set-screws for clamping the lens supporting fingers in their sockets, sockets carried by the lenses and slidably mounted upon the outwardly extending portions of the lens supporting fingers, such sockets having bores of angular cross-section, set-screws for clamping the sockets of the lenses to the said lens supporting fingers, nose-pieces, arms having the nose-pieces pivoted to their inner ends and being bent in U-form at their outer ends, pins one of which extends through the bent end of each of said arms and through the lugs of each of the sockets, a coil spring encircling each one of said pins and bearing at its ends against the socket and bent end of the arm, respectively, and finger pieces extending outwardly from the bent ends of said arms.

In testimony whereof, I have signed my name to this specification.

ZOËL MARCEL LÉGER.

Copies of this patent may be obtained for five cents each, by addressing the "Commissioner of Patents, Washington, D. C."